United States Patent [19]
Jindal

[11] Patent Number: 5,845,273
[45] Date of Patent: Dec. 1, 1998

[54] METHOD AND APPARATUS FOR INTEGRATING MULTIPLE INDEXED FILES

[75] Inventor: Ajay Kumar Jindal, Kirkland, Wash.

[73] Assignee: Microsoft Corporation, Redmond, Wash.

[21] Appl. No.: 670,159

[22] Filed: Jun. 27, 1996

[51] Int. Cl.[6] .................................................. G06F 17/30
[52] U.S. Cl. ............................................. 707/1; 707/102
[58] Field of Search .................................. 707/1, 2, 3, 4, 707/5, 6, 100, 102, 200, 201, 205; 397/200.53, 183.14; 345/440

[56] References Cited

U.S. PATENT DOCUMENTS

| | | | |
|---|---|---|---|
| 4,754,326 | 6/1988 | Kram et al. | 707/1 |
| 5,293,385 | 3/1994 | Hary | 395/183.14 |
| 5,557,747 | 9/1996 | Rogers et al. | 395/200.53 |
| 5,608,898 | 3/1997 | Turpin et al. | 707/201 |
| 5,636,350 | 6/1997 | Eick et al. | 345/440 |
| 5,704,060 | 12/1997 | Del Monte | 1/1 |

*Primary Examiner*—Thomas G. Black
*Assistant Examiner*—Ruay Lian Ho
*Attorney, Agent, or Firm*—Jones & Askew, LLP

[57] ABSTRACT

A system for integrating multiple indexed files and searching the resulting integrated indexed file. An indexed core content file, which includes a core keyword list containing core keywords, can be updated with update keywords of an update content file. The update content file is accessed and, in response, a virtual keyword list is generated. The virtual keyword list, which contains update keywords and core keywords, is created by determining a position for inserting each update keyword within the core keyword list and positions for each core keyword affected by the insertion of update keywords. An index mapping table is created for tracking the positions of the update keywords and the core keywords within the virtual keyword list. The index mapping table maps the positions of the update keywords within the virtual keyword list to the update keywords within the update content file and maps the positions of the core keywords within the virtual keyword list to the core keywords within the core keyword list.

24 Claims, 8 Drawing Sheets

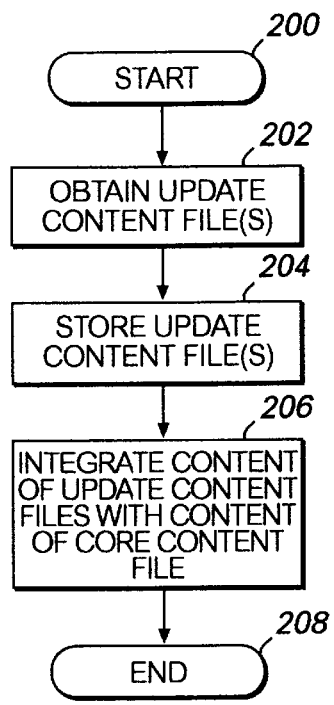
FIG. 2
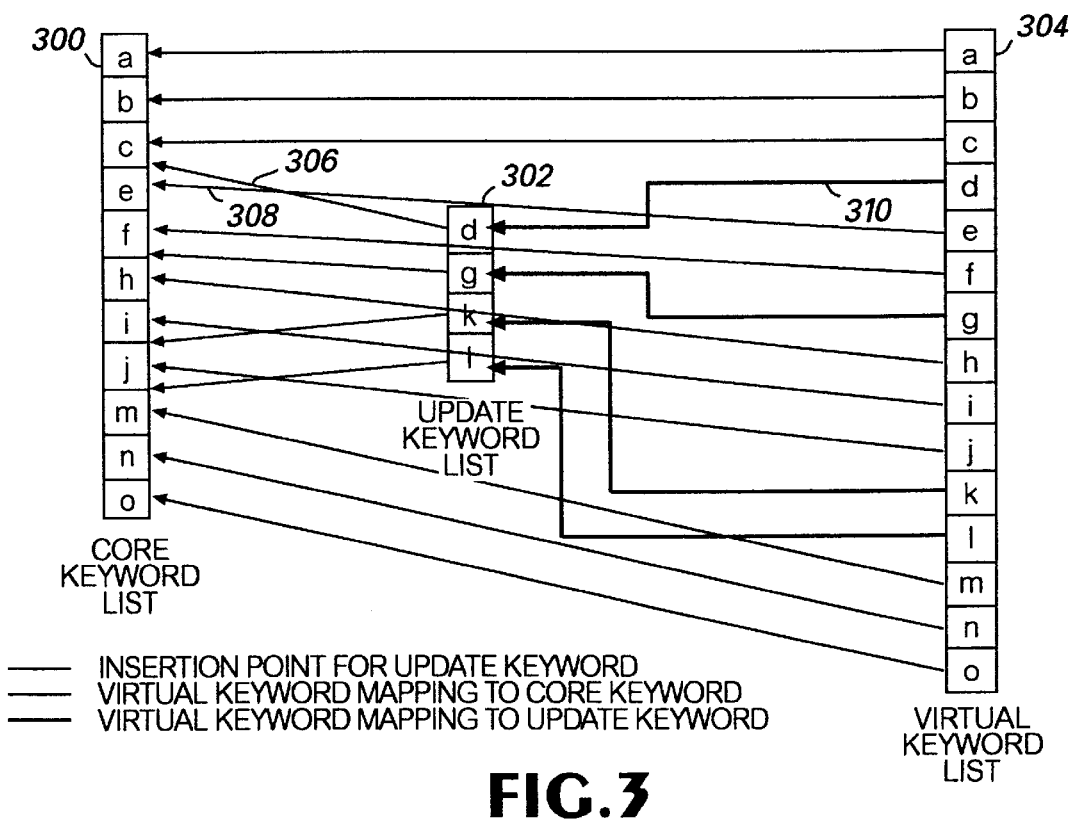
FIG. 4
FIG. 3

METHOD AND APPARATUS FOR INTEGRATING MULTIPLE INDEXED FILES

FIELD OF THE INVENTION

This present invention is generally directed to the integration of multiple indexed files and, more particularly, to creating and searching an integrated indexed content file that combines existing indexed content with additional updated indexed content.

BACKGROUND OF THE INVENTION

In view of the computer industry's relatively rapid acceptance of the compact disk-readable only memory (CD-ROM), the favored computer-read memory device for storing extensive data and large executable programs, it is not surprising that computer software vendors have embraced the CD-ROM technology to market a variety of computer-readable reference materials. Although many still enjoy pulling a big reference book, such as a dictionary, atlas, or encyclopedia, off a shelf and browsing through the pages, some computer users, including many school-age children, insert a CD-ROM into their computer to review desired reference information. Indeed, some will argue that the availability of reference materials on CD-ROM is one of the strongest reasons for obtaining a home computer system. Representative examples of reference materials commercially available on CD-ROM include Microsoft's "ENCARTA"-series of encyclopedias, Microsoft's "MUSIC CENTRAL", which offers reviews, audio excerpts, and articles about rock, jazz and pop music, and Microsoft's "CINEMANIA", which supplies film clips and movie-related articles and reviews.

Computer-readable reference materials typically contain reference content that is indexed by keywords maintained in a keyword list. A user can locate an article of interest by selecting a keyword related to the desired article and thereafter using the selected keyword to search the resource content for the articles linked or indexed with this keyword. If the desired article is indexed by the selected keyword, then it can be retrieved from the CD-ROM and presented to the user. Keyword searching for desired articles or topics is a convenient and powerful tool for obtaining desired information maintained on a CD-ROM.

Reference materials on CD-ROM share at least one common flaw with their book counterparts—both tend to go out of date after initial distribution to consumers. For reference books, a publisher typically issues a new edition or a supplement on an annual basis to update the existing materials. In contrast, vendors of CD-ROM-based reference materials have the option of taking advantage of the communication channels offered by a typical computing environment and deliver updated material and supplemental information via an on-line service. For example, a user can access a computer network, such as the Internet or a private service provider network, with a modem-equipped computer to download available updated and supplemental information on an as needed basis. Typical sources of on-line updates offer such updates on a monthly basis to the consumer.

Once an update has been downloaded to a computer system, there still exists a need for combining the present reference material information with the updated or supplemental information for convenient access by the user. For example, although indexed content supports convenient access of desired information based on a search of the content based on a selected keyword, the updating of indexed content also requires the combination of the existing and update indexes.

A prior technique for presenting updated content is the use of a separate user interface or program section dedicated for viewing of the updated information. For example, a primary user interface is used to view original content information and a secondary user interface is used for viewing the updated information. This is analogous to using an update volume of an encyclopedia set, typically a yearbook, to obtain updated information that is not provided by the original encyclopedia set. It will be appreciated that this use of separate user interfaces for presenting existing content and upgraded content forces the user to switch between user interfaces to access the combination of existing and upgraded information. In addition, the use of separate user interfaces requires the user to differentiate between past and current content prior to selecting the appropriate user interface to access the desired information. Another prior technique for presenting updated content is attaching an addendum to existing related material and presenting the combination of the existing material and the addendum via a single user interface. However, this solution fails to address the need for presenting new content that is not associated with existing content, such as a replacement article or section. For example, in the event that the original content contains movie reviews, there is no mechanism offered by this prior solution to provide updated information containing reviews of new movies.

In view of the foregoing, there is a need for an integrated navigation model for accessing a combination of existing content and updated content. There is also a need for a system for integrating existing and update keyword lists, as well as related existing and update content, while conserving the mass memory storage required to maintain the update keyword list. The present invention addresses these issues by providing a system for integrating multiple indexed content files to support the viewing of the combined content as if this information was presented by a single indexed file.

SUMMARY OF THE INVENTION

The present invention addresses the above-described needs by providing a system for integrating multiple-indexed content files to support convenient access of the combined content. The invention allows a user to expand and update the content of a computer file, such as a reference software program, by (1) obtaining additional content files, typically by down-loading these files from an on-line service, and (2) integrating the new content offered by the additional content files within the framework of the existing content.

From the user's perspective, a navigation model for viewing the content of a content-based program module is preferably extendible to new content information, including upgraded content and supplemental content. This navigation model supports an index search model, such as keyword searching, to locate a desired search term from a combination of an existing core content file and new content files. The present invention addresses these issues by merging "keywords" for new content files, called update books or update content files, into the core keywords for an existing core book or core content file. An internal data structure, maintained in computer memory and known as an "index mapping table", can be created to track the insertion of the update keywords within an existing list of core keywords, and to define offset amounts for the core keywords. The offset amounts are determined by the insertion of the update keywords within the core keyword list.

Significantly, the present invention achieves the merger of update and core keywords while minimizing the use of hard disk drive space for storing a "merged" keyword list. This advantage can be achieved by supplying only update keywords, rather than a combination of update and core keywords, to update the existing indexed content of a core file or book. In this manner, hard disk space is allocated only for the storage of the update keywords required to update the existing core content. This reduced storage space aspect is particularly desirable in view of the frequency for conducting the typical indexed file integration task—the updating of a core file containing materials typically occurs on a regular periodic basis, such as once a month. The index mapping table, which is typically stored on the hard disk drive, supports the conservation of mass memory storage by mapping the positions of update and core keywords within update and keyword lists to a "virtual" keyword list that represents the ordered merger of the update and core keyword lists.

A core content file typically includes a core keyword list defining core keywords. Each core keyword is identified by a core keyword index number, and the core keyword list is typically sorted to order the keywords by value. For example, the core keyword list can be rank-ordered from low to high value, such as alphabetical order or numerical order. In similar fashion, an update content file typically includes an update keyword list defining keywords, each identified by an update keyword index number. The update keyword list also can be sorted to order the keywords from low to high value.

In response to obtaining new content files, the indexed information of these update content files can be merged with the indexed content of the existing core content file. This merger operation is initiated by identifying a first keyword within each update content file. For example, a pointer for each update content file is initially set to point to the update keyword having the lowest value in the update content file. In addition, a core offset value is initialized to a predefined value.

An identified update keyword having the lowest value among all update content files is then selected, and a position within the core keyword list is located for inserting the identified update keyword. If there is more than one update keyword among the update content files having the identical lowest value, then the update keyword for the most recent update content file is selected and the pointers for the other update content files are incremented. The identified update keyword can be inserted immediately prior to a core keyword having the smallest value that is equal to or greater than the identified update keyword. The location of the identified update keyword in the core keyword list is the "core keyword insertion point". The core keyword insertion point is defined by the index number of the smallest core keyword that is greater than or equal to the identified update keyword.

In response to locating an insertion point for the identified update keyword, an entry can be added to the internal data structure of the index mapping table. The index mapping table maps the positions of the update keywords and the core keywords to positions within the virtual keyword list that represents the ordered combination of the core and update keyword lists.

Each entry in the index mapping table contains data fields for a virtual table index number, a core offset value, an update file identifier, and an update keyword index number. A virtual table index number defines the position of a corresponding update keyword in the virtual keyword list and serves as a virtual keyword index number for this entry within the virtual keyword list. A core offset value defines a shift in position of all core keywords located after the corresponding update keyword, the position shift occurring as a result of the insertion of update keywords within the core keyword list. An update file identifier identifies the update content file associated with the corresponding update keyword. An update index defines an update keyword index number for the corresponding update keyword and identifies the position of the corresponding keyword within an update keyword list of the update content file.

In response to assigning values to the new entry of the index mapping table, the pointer for the selected update content file is incremented. The above-described steps can then be repeated for each of the remaining update keywords, thereby completing construction of the index mapping table.

The fields in the index mapping table entry may be completed as follows. The virtual table index number is defined by the sum of the core offset value and the core keyword insertion point. The core offset value field is set to the present core offset value. In the event that the identified update keyword is less than the selected core keyword, then the core offset value is incremented, preferably by a value of 1. In contrast, if the identified update keyword is equal to the selected core keyword, then the core offset value is not incremented. If the identified update keyword is an exact match for the selected core keyword, the update content file contains supplementary content for the core content corresponding to this keyword (rather than a completely new topic). This may be a complete replacement of the core content topic or an addendum to the core content topic. The update file identifier field is set to the update file identifier for the selected update content file associated with the identified update keyword. The update index field is set to the index number of the identified update keyword.

Once the index mapping table is created, this memory-resident data structure can be accessed to locate a keyword for the merged content files. A search index value corresponding to the desired keyword is identified. In turn, the largest virtual table index number that is less than or equal to the search index value is selected in the index mapping table. If the selected virtual table index number is not equal to the search index value, then a core keyword index value is calculated by subtracting the core offset value from the search index value. This core keyword index value can be used to locate the desired keyword in the core keyword list.

In contrast, if the selected virtual table index number is equal to the search index value, then the core offset value associated with the selected index value is compared to the core offset value in a previous entry of the index mapping table. If the core offset values are different, then the update index associated with the selected index number is used to look-up the keyword in the corresponding update content file. If the core offset values are the same, then the search index number is associated with supplementary content information and core keyword index number is calculated by subtracting the core offset value from the search index value. This core keyword index number can be used to locate the desired keyword in the core keyword list. Even though a core keyword is returned, the update file identifier and index number should be noted so that when the topic from the core content is displayed, the supplementary information from the update content file may also be displayed along with it.

Similarly, a search for a specific keyword may be done by searching for the keyword in the core content file and each update content file, which results in a core index and a series of update indices. The best keyword is selected based on application-specific selection criteria, and the index combination is converted to a virtual keyword index number for the virtual keyword list.

For example, the search keyword, which corresponds to a desired virtual keyword index number, is used to search for the closest match in the core keyword list and each update keyword list. In response to searching the core keyword list, a selected core keyword representing the closest match to the search keyword is returned. Likewise, for each update content file, a selected update keyword representing the closest match to the search keyword is returned. The closest match provided by these keyword searches is identified by a keyword having the same value as the search keyword or the keyword having the largest value less than the search keyword. In the alternative, if the search does not locate a keyword having the same value as the search keyword, then the keyword having the smallest value greater than the search keyword can be returned.

A search criterion is applied to determine which of the selected core keyword and selected update keywords represents the "best" match for the search keyword. This search criterion is application-specific and is not limited to selecting only a single one of the selected keywords. For example, a particular search criterion may return a set of selected keywords representing the "best" match to the search keyword. A typical search criterion defines the "best" match to be the selected core keyword or the selected update keyword having the largest value that is less than or equal to the value for the search keyword.

In the event that the selected core keyword represents the best match, then the index mapping table is searched to locate a particular table entry. The particular table entry contains values that satisfy the following: (virtual table index number+1−core offset value) is less than or equal to core keyword index number for the selected core keyword. The virtual keyword index number can be calculated by summing the core keyword index number for the selected core keyword and the core offset value for the particular table entry.

In the event that one of the selected update keywords represents the "best" match for the search keyword, a search is conducted of the index mapping table to locate a particular table entry. The particular table entry is identified by an update file identifier field having a value that is equal to the update identifier for the update content file associated with the selected update keyword and an update index field having a value that is equal to the update keyword index number for the selected update keyword. The virtual keyword index number is defined by the table index number for this particular table entry.

That the present invention overcomes the above-described problems of the prior art will be apparent to those skilled in the art based on the drawings, the detailed description to follow, and the appended claims.

BRIEF DESCRIPTION OF THE DRAWINGS

FIG. 2 is a logical flow diagram illustrating the principal steps of a method for obtaining an indexed update content file and merging the update content file with an indexed core content file to produce an integrated indexed content file.

FIG. 3 is a diagram illustrating a core keyword list, an upgrade keyword list, and a virtual keyword list representing the merger of the core and upgrade keyword lists in accordance with an embodiment of the present invention.

FIG. 4 is a diagram illustrating an index mapping table for the virtual keyword list of FIG. 3 in accordance with an embodiment of the present invention.

DETAILED DESCRIPTION

Figure 1:
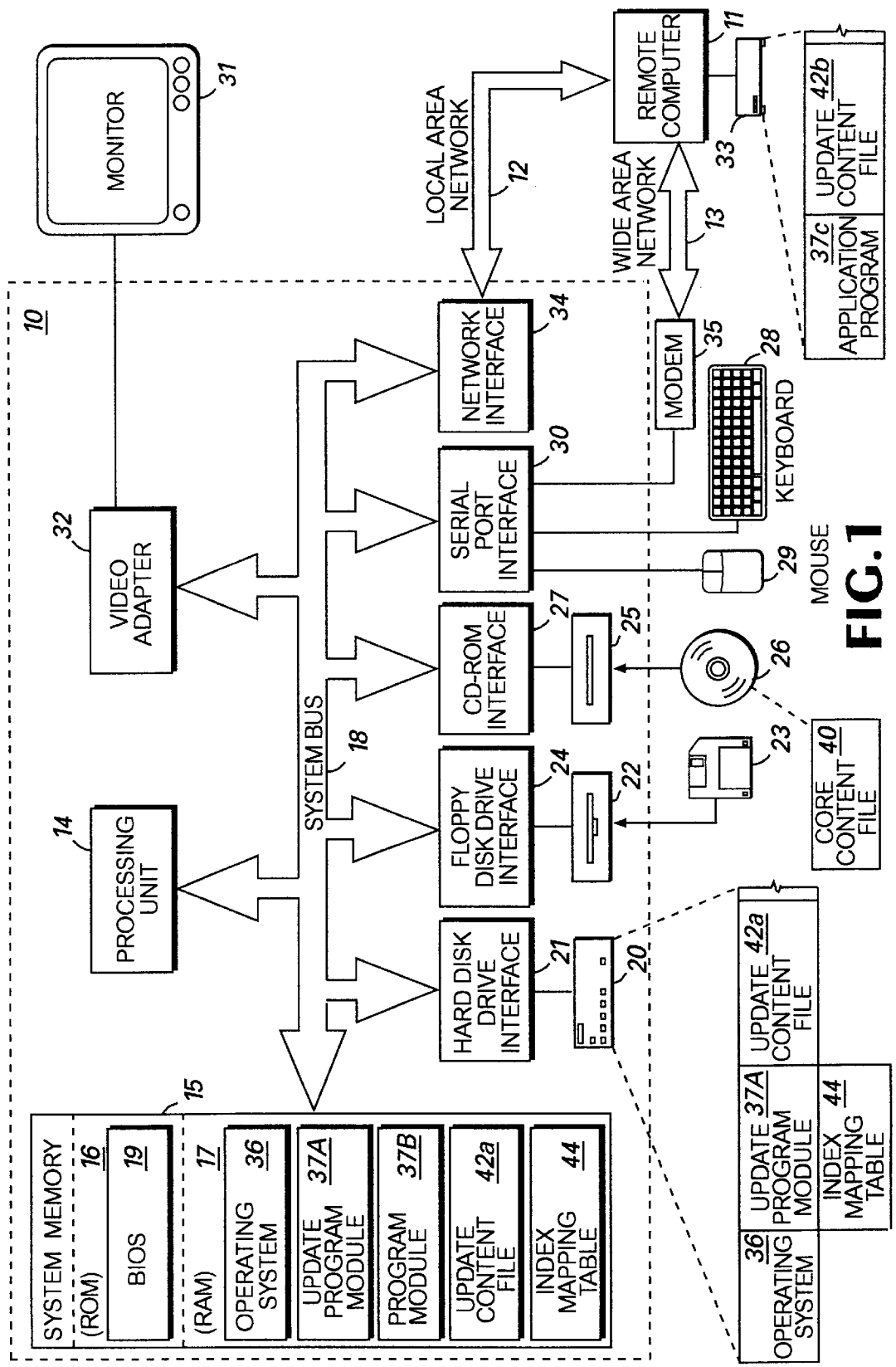
FIG. 1 is a block diagram illustrating the operating environment for the preferred embodiment of the present invention.

The present invention is directed to a system for integrating multiple indexed files and for searching the resulting integrated indexed file. An indexed content file, which includes a core keyword list containing core keywords, can be updated with update keywords of an update content file. The update content file is accessed and, in response, a virtual keyword list is generated. The virtual keyword list, which contains update keywords and core keywords, is created by determining a position for inserting each update keyword within the core keyword list and a position for each core keyword resulting from the insertion of each update keyword. An index mapping table is created for tracking the positions of the update keywords and the core keywords within the virtual keyword list. The index mapping table, which is implemented as an internal data structure, maps the positions of the update keywords within the virtual keyword list to the update keywords within the update content file and maps the positions of the core keywords within the virtual keyword list to the core keywords within the core keyword list in a compact manner.

Although the preferred embodiment will be generally described in the context of program modules, such as an application program and an operating system running on a personal computer, those skilled in the art will recognize that the present invention also can be implemented in conjunction with other program modules and other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

The detailed description which follows is represented largely in terms of processes and symbolic representations of operations by conventional computer components, including a processing unit, memory storage devices, display devices, and input devices. Furthermore, these processes and operations may utilize conventional computer components in a heterogeneous distributed computing environment, including remote file servers, computer servers, and memory storage devices. Each of these conventional distributed computing components is typically accessible to the work computer via a communication network.

The processes and operations performed by the computer include the manipulation of electrical signals by a local processing unit or remote server, and the maintenance of these signals within data structures resident in one or more of the local or remote memory storage devices. Such data structures impose a physical organization upon the collection of information, such as data bits, stored within a memory storage device and represented by specific electrical or magnetic elements. These symbolic representations are the means used by those skilled in the art of computer programming and computer construction to most effectively convey teachings and discoveries to others skilled in the art.

For the purposes of this discussion, a process is generally viewed as a sequence of computer-executed steps leading to a desired result. These steps generally require manipulations of physical quantities. Usually, though not necessarily, these quantities take the form of electrical, magnetic, or optical signals capable of being stored, transferred, combined, compared, copied, or otherwise manipulated. It is conventional for those skilled in the art to refer to these signals as bits, bytes, values, elements, symbols, characters, instructions, function statements, commands, records, objects, images, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, the present invention and the preferred operating environment will be described.

The Computing Environment

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in appropriate programming manuals, user guides, and similar publications.

As shown in FIG. 1, a computer 10 is operated in a networked environment with logical connections to a remote computer 11. The logical connections between the computer 10 and the remote computer 11 are represented by a local area network 12 and a wide area network 13. Those persons skilled in the art will recognize that the remote computer 11 may function as a file server or compute server in this client/server configuration.

The computer 10 includes a processing unit 14, such as the 80486 or "PENTIUM" microprocessors manufactured by Intel Corporation of Santa Clara, Calif. It will be understood that the computer 10 can include other processing unit models, such as a member of the MIPS family by Silicon Graphics, Inc. or a PowerPC processor by Motorola Corporation. The computer 10 also includes system memory 15 (including read only memory (ROM) 16 and random access memory (RAM) 17), which is connected to the processing unit by the system bus 18. A basic input/output system (BIOS) 19 for the preferred computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using an input device, such as a keyboard 28, and/or a pointing device, such as a mouse 29, which are connected to the system bus 18 via a serial port interface 30. Other types of pointing devices (not shown in FIG. 1) include track pads, track balls, head-tracker, pen, data glove, and other devices suitable for positioning a cursor on a video monitor 31. The video monitor 31 is connected to the system bus 18 via a video adapter 32.

The video monitor 31 represents the preferred pixel-oriented output device for use with the present invention. However, the present invention is not limited to use with conventional video monitor devices, but extends to other types of pixel-oriented devices. It is well known to those skilled in the art that pixel-oriented display devices can include both active light-generating devices, such as CRT displays, and light-absorbing or blocking devices, such as back-lit LCD displays, dot matrix printers, and laser printing devices. These pixel-oriented display devices will be collectively described as display devices or output devices in this specification.

The remote computer 11 in this networked environment is connected to a remote memory storage device 33. This remote memory storage device 33 is typically a large capacity device, such as a hard disk drive, CD-ROM drive, magneto-optical drive or the like. The computer 10 is connected to the remote computer 11 by a network interface 34, which is used to communicate over the local area network 12.

As shown in FIG. 1, the computer 10 is also connected to the remote computer 11 by a modem 35, which is used to communicate over the wide area network 13, such as a distributed computing environment commonly described as the Internet. The modem 35 is connected to the system bus 18 via the serial port interface 30, and can be connected to a telephony network, such as the public switched telephone network (PSTN) or a community antenna television (CATV) network. Although illustrated in FIG. 1 as external to the computer 10, those of ordinary skill in the art will quickly recognize that a modem 35 may also be internal to the remote computer 11, thus communicating directly via the system bus 18. It is important to note that connection to the remote computer 11 via both the local area network 12 and the wide area network 13 is not required for computer operations, but merely illustrates alternative methods of providing a communication path between the computer 10 and the remote computer 11.

Although many other internal components of the computer 10 are not shown, those of ordinary skill in the art will appreciate that such computer components and the interconnection between them are well known. Accordingly, additional details concerning the internal construction of the computer 10 need not be disclosed in connection with the present invention.

Those skilled in the art will understand that program modules, such as an operating system 36 and program modules 37, can be accessed by the computer 10 via one of the memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and program modules. For another embodiment, however, the operating system and the program modules can be stored on one or more CD-ROMs 26.

The preferred embodiment of the present invention is represented by Microsoft's "CINEMANIA" program, which is a reference source for movie lore and film clips. The "CINEMANIA" program is typically distributed to consumers on a CD-ROM, and can be updated by accessing an on-line service, such as the Microsoft Network (MSN). The "CINEMANIA" program is a representative example of a source of resource materials that can be conveniently accessed and, as required, updated by use of a computer system, such as the computer 10. Although the present invention will be primarily described with reference to Microsoft's "CINEMANIA" program, those skilled in the art will appreciate that the present invention can be extended to other types of programs requiring updated or supplemental material, including reference materials such as encyclopedias, atlases, dictionaries, and so forth.

Those skilled in the art will understand that computer-readable reference materials typically contain reference content that is indexed by keywords maintained in a keyword list. For example, a user can locate an article of interest by selecting a keyword related to a desired topic or article. Because the desired article is indexed by the selected keyword, it can be retrieved from a memory storage device, such as the CD-ROM 26, in response to selection of the keyword and thereafter presented to the user. Keyword searching for desired articles or topics is a convenient and powerful tool for obtaining desired information maintained on a CD-ROM.

Still referring to FIG. 1, a core content file 40 contains indexed content information, such as reference materials, and is typically maintained on a CD-ROM 26. One or more update content files 42, such as the update content files 42a and 42b, can be used to update or replace the indexed content of the core content file 40. An update content file 42, such as update content file 42b, is typically downloaded from an on-line service via a computer network, such as the wide area network 13, and stored on a memory storage device, such as the local hard disk drive 20. Similar to the core content file 40, each update content file 42 contains indexed content for updating or replacing the indexed content of the core content file 40. The update content of the update content files 42 can be "merged" with the core content of the core content file 40 to achieve the effective integration of multiple indexed files. An update program module 37a, preferably stored within system memory, such as RAM 17, supports the merger of a core content file with one or more update content files.

For the preferred embodiment, the core content file 40 is compiled by using a program module called "MEDIA VIEW", which is distributed by Microsoft Corporation for use primarily by the software development community. For reference materials containing numerous articles, the articles are assembled and formatted as individual rich text format (RTF) files. In turn, these RTF files are input to a compiler of the "MEDIA VIEW" program to create an output file commonly called a M-14 file or a Media View, Version 1.4 file. A single M-14 file represents a core content file comprising the assembled articles. In addition, the "MEDIA VIEW" program supports the indexing of these articles based on the assignment of core keywords to these items. For example, the "MEDIA VIEW" program can maintain a list of the keywords assigned to the core content of the M-14 file and, in response to selection of a keyword, the program can identify the articles associated with the selected keyword.

FIG. 2 is a logical flow diagram illustrating representative steps for updating a core content file with update content files to integrate multiple indexed content files. Turning now to FIGS. 1 and 2, the content update process starts at the START step 200 and proceeds to step 202 to access one or more update content files 42. For the preferred computing environment, each update content file 42 can be conveniently obtained from a central source, such as a web server, that is accessible by computers connected to a wideband computer network. This allows the update content files 42 to be maintained at a central archival site and to be downloaded as required to the computer 10 via the wide area network 13. For example, the update content files 42 can be accessed from an on-line service offered by a commercial service provider via a proprietary computer network, or accessed via a dedicated web server on the Internet. In this manner, each update content file 42 can be downloaded on an as-needed basis from the central source site to the computer operated by the user of the core content file 40.

In step 204, each update content file obtained during step 202 is stored by the computer 10 on a memory storage device, such as the hard disk drive 20 or the floppy disk 23. Although the core content file 40 and each update content file 42 contains indexed content, the original content source, i.e., the core content file 40, typically contains significantly more indexed content than any single update content source, such as the update content file 42. As will be described in more detail with respect to FIG. 3, the core content file 40 comprises content that is indexed by keywords to support searching and retrieval of desired indexed content. Likewise, each update content file 42 comprises update content that is indexed by keywords. In response to starting the program module associated with the core content file 40, the core content is integrated with the update content of each update content file 42 in step 206. This supports the integration of a core keyword list of the core content file 40 with the update keyword list of each update content file 42. This integration of the core and update keyword lists will be described in more detail below with respect to FIGS. 3–7. The update process terminates at the END step 208.

The indexed content of the core content file 40 can be navigated by selecting a keyword from the core keyword list and searching the core content to locate the content associated with the selected core keyword. In other words, the preferred navigation model for the core content file 40 is a keyword search and retrieval system. Those skilled in the art will appreciate that other navigation models can be used in combination with this keyword search and retrieval system, including a full text search and hot spots linked to related content of the core content file.

Focusing on the keyword search and retrieval system, those skilled in the art will appreciate that it is desirable to maintain this navigation model for a combination of the core content file 40 and one or more update content files 42. Moreover, it is desirable to combine the core content file 40 and the update content files 42 in a manner that prevents the user from readily recognizing the particular source of the desired content, i.e., the core content file or an update content file, to achieve a seamless integration of multiple indexed files. To accomplish this objective, the update keyword list for a selected update content file 42 is merged with the core keyword list of the core content file 40. This merger of the keyword list results in a "virtual" keyword list based on the insertion of the update keywords of the update keyword lists from each update content file into the core keyword list of the core content file 40. FIG. 3 is a diagram illustrating the merger of an update keyword list with a core keyword list to create a merged keyword list, which is also described as a virtual keyword list.

Turning now to FIGS. 1 and 3, a core keyword list 300 defines the core keywords 300 for the core content file 40. An update keyword list 302 defines the update keywords 302 for an update content file 42. A virtual keyword list 304 can be created by inserting the update keywords 302 within the core keyword list 300. For example, the update keyword "d" can be inserted within the core keyword list 300 at an insertion point 306. By inserting an update keyword 302 among the core keywords 300, the core keywords positioned after the insertion point are effectively shifted or offset by an offset value relative to the core keyword list. Thus, the virtual keyword list 304 represents the ordered combination of the core keywords 300 and the update keywords 302.

The virtual keyword list 304 maintains a mapped link to each of the core keywords within the core keyword list 300, including the shifted positions for the core keywords affected by the insertion of the update keywords. For example, a mapped link 308 maps the core keyword "e" to a corresponding entry within the virtual keyword list 304. Prior to insertion of the update keyword "d" within the core keyword list 300, the core keyword "e" was the fourth entry within the core keyword list. Because the core keyword "e" was affected by the insertion of the update keyword "d", the fifth entry in the virtual keyword list 304 corresponds to the core keyword "e". Likewise, the fourth entry within the virtual keyword list 304 corresponds to the first entry within the update keyword list 302, namely the update keyword "d". A mapped link 310 maps the update keyword "d" to an entry within the virtual keyword list 304. As shown in the example presented by FIG. 3, the core keywords "a", "b", and "c", which represent the first three entries of the core keyword list 300 prior to the insertion point, are mapped directly into the first three entries of the virtual keyword list 304.

Each of the entries within the core keyword list 300, the update keyword list 302, and the virtual keyword list 304 can be identified by an index number. For example, the first entry within the core keyword list 300, "a", can be uniquely identified by a core keyword index number, which is assigned a value of one. In similar fashion, an update keyword index number and a virtual keyword index number, each set to a value of one, can be used to respectively identify the first entry within the update keyword list 302 and the virtual keyword list 304.

The core keyword list 300 and the update keyword list 302 are preferably rank ordered based on the value of the respective core keywords and update keywords. Typically, the core keywords 300 and the update keywords 302 are ordered from low value to high value, wherein the lowest value is arranged as the first entry, the next highest value is arranged as the second entry, and so forth. Because the core keywords and the update keywords are typically represented by alphanumeric data strings, the keywords in the core keyword list 300 and the update keyword list 302 can be arranged in alphabetical order. Nevertheless, those skilled in the art will appreciate that other rank ordering schemes can be used to arrange the entries within the core and update keyword lists 300 and 302.

In view of the foregoing, it is useful to briefly review a representative example for inserting an update keyword within the core keyword list. For this illustrative example, the update keyword "mongoose" is read from a memory storage device, such as the hard disk drive 20, for insertion within the core keyword list. Based on the present core keywords within the core keyword list, it can be determined that the update keyword "mongoose" should be placed between the core keywords identified by core keyword index numbers 456 and 457. Based on this insertion point, the update keyword "mongoose" is assigned a virtual keyword index number of 457 within the virtual keyword list. All core keywords corresponding to core keyword index numbers of 457 and higher are affected by the insertion of the update keyword "mongoose" within the core keyword list. Specifically, starting with the core keyword identified by the core keyword index number 457, each remaining core keyword is offset by a value of one relative to the core keyword indexing scheme. In other words, the core keyword having a core keyword index number of 457 is assigned a virtual keyword index number of 458 rather than a value of 457. In view of the foregoing, it will be appreciated that the entries within the virtual keyword list 304 can be used to track the insertion of the update keywords 302 within the core keyword list 300 and the relative placement of the core keywords 300 resulting from the insertion points.

The creation of the virtual keyword list 304 is supported by an internal data structure maintained in system memory, such as the RAM 17 or the hard drive 20. An index mapping table 44 keeps track of the inserted update keywords and the offset values associated with the core keywords as a result of the insertion points. By only tracking the insertion points and the core offset values, this internal data structure can be accessed to return a desired keyword, which is retrieved from the corresponding core or update content file based on the proper core or update keyword index number.

FIG. 4 is a diagram illustrating a typical index mapping table for implementing an internal data structure that tracks the entries within the virtual keyword list and maps these entries to the entries within the core and update keyword lists. Turning now to FIGS. 1, 3, and 4, an index mapping table 400, such as the example shown in FIG. 4, is typically created in response to obtaining the update keyword list from a selected update content file and inserting the update keywords within the core keyword list. As described above, with respect to FIG. 3, the entries of the virtual keyword list represent a combination of update keywords and core keywords. Thus, the index mapping table 400 maps the entries of the virtual keyword list to the appropriate entries within the core and update keyword lists, while tracking insertion points and relative offset values.

The index mapping table 400 can contain multiple table entries, each containing data fields for a virtual table index number 402, a core offset value 404, an update file identifier 406, and an update index 408. The virtual table index number 402 defines the position of a update keyword within the virtual keyword list and corresponds to a virtual keyword index number. The core offset defines a shift in position of all of the core keywords located after the corresponding update keyword and adjacent to the next entry. This position shift is a result of the insertion of update keywords 302 within the core keyword list 300. The update file identifier 406 identifies the update content file associated with the corresponding update keyword. The update index 408 defines an update keyword index number for the corresponding update keyword. This update keyword index number defines the position of the corresponding update keyword within an update keyword list of the identified update content file.

In general, to locate an update keyword or a core keyword, the largest number within the virtual table index number field 402 that is smaller than or equal to the corresponding virtual keyword index number is located within the index mapping table 400. If the selected virtual keyword index number is greater than the value in the virtual table index number field 402, then a core keyword index number is calculated by subtracting the value in the core offset field from the virtual keyword index number. This calculated core keyword index number can be used to locate the corresponding core keyword within the core content file. In contrast, if the selected virtual keyword index number is equal to the value in the virtual table index number field 402, then the update keyword index number defined by the update index field 408 is used to locate the update keyword within the update keyword list of the update content file identified by the update file field 406.

The representative example of the index mapping table shown in FIG. 4 contains table entries 410, 412, 414, 416, 418, and 420. The table entry 410 includes a virtual table index number field 402 and a core offset value field 404 assigned to an initial value of zero. The remaining table entries 412–420 are associated with one of a pair of update content files 42, which are identified by the update file identifiers "UPD01" and "UPD02". For this representative example, the update content file identified by the update file identifier "UPD01" contains a list having a pair of update keywords, a first update keyword having an update keyword index number of "zero" and a second update keyword having an update keyword index number of "one". Likewise, the update content file "UPD02" contains a list having keywords, a first update keyword having an update keyword index number of "zero" and a second update keyword having an update keyword index number of "one". The table entries 412, 414, and 416 track the insertion of the first and second update keywords for the update content file "UPD01" within the core keyword list. Similarly, the table entries 418 and 420 track the insertion of the first and second update keywords for the update content file "UPD02" within the core keyword list.

Focusing now on a detailed review of the parameters for the table entry 412, which is a representative table entry, the virtual table index number field 402 is assigned a value of "33"; the core offset value field 404 is assigned a value of "1"; the update file identifier field 406 identifies the update content file "UPD01"; and the update index field 408 is assigned a value of "zero". This entry indicates that an update keyword, which is identified by an update keyword index number of "zero" and stored within the update content file "UPD01", is inserted between the core keywords identified by the core keyword index numbers "32" and "33". In addition, the table entry 412 indicates that the core keyword identified by the core keyword index number "33" has been shifted by a core offset value of "one" as a result of inserting the update keyword. Indeed, all core keywords 33–95 are shifted by a value of one.

Because the index mapping table 400 is associated with two separate update content files, the table must include an update file identifier field 406 for distinguishing the update content files. Those skilled in the art will appreciate that the update file identifier field 406 can be eliminated if the index mapping table is directed to only a single update content file. Likewise, for a single update content file, the update index field 408 can be eliminated because the update keyword index number for a particular table entry can be calculated by subtracting a value of "one" from the value in the core offset field 404. For the simple environment of a single update content file, the index mapping table can comprise entries containing the virtual table index number field and the core offset value field.

Figures 5A, 5B:
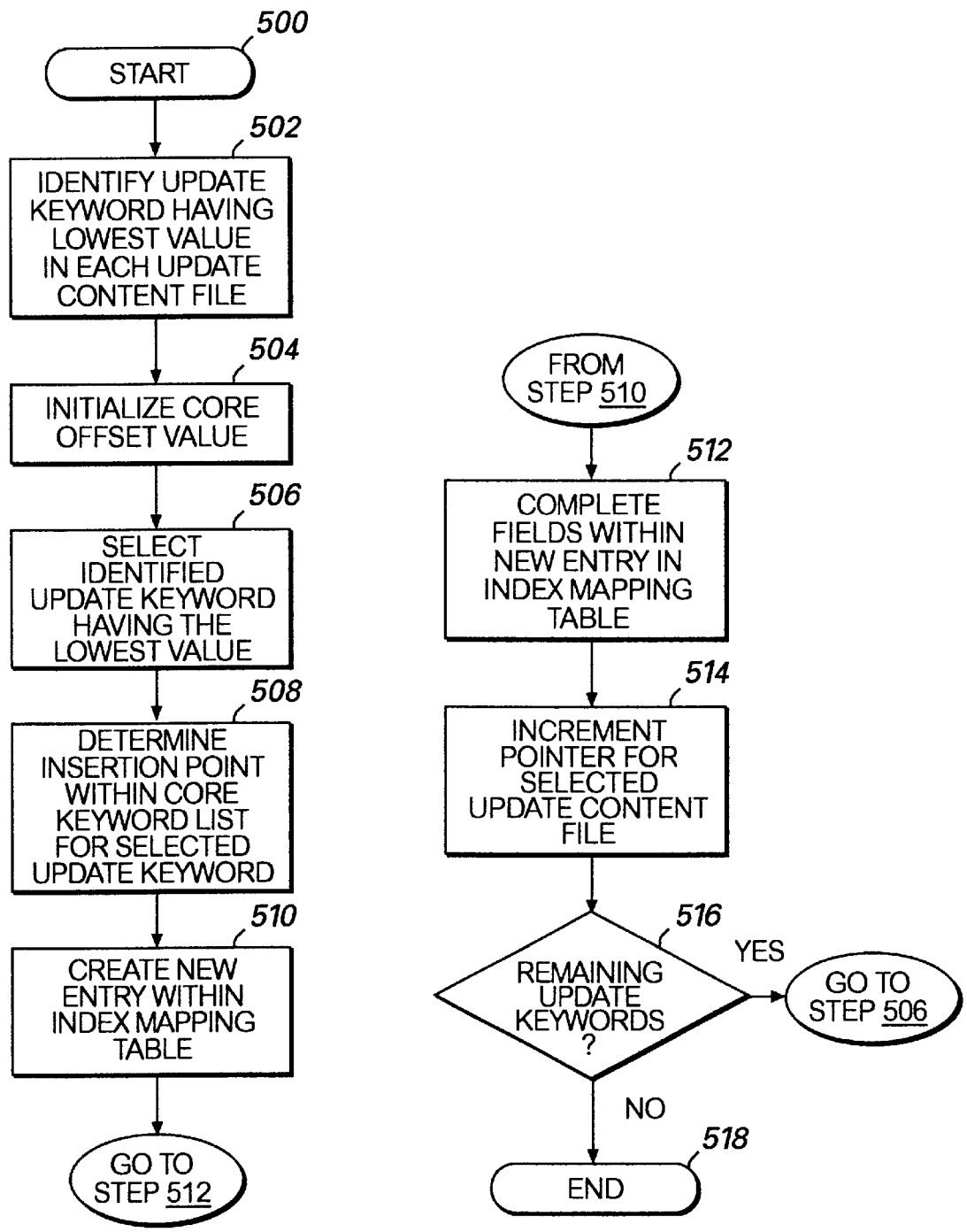
FIGS. 5A and 5B, collectively described as FIG. 5, are logical flow diagrams illustrating a computer-implemented method for creating a virtual keyword table and an associated index mapping table in accordance with an embodiment of the present invention.
Figure 6:
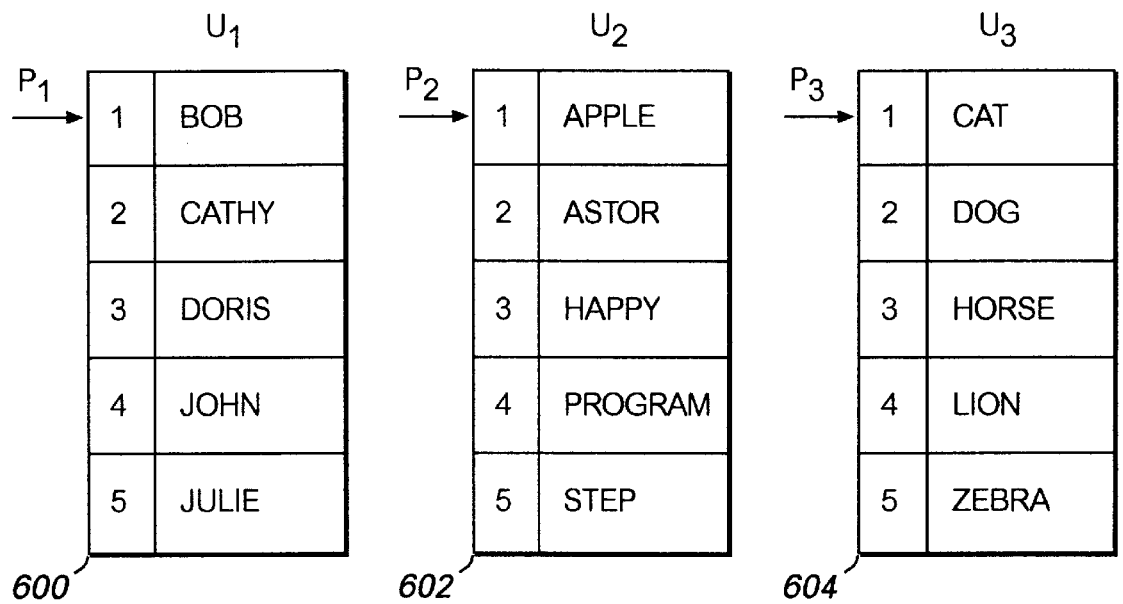
FIG. 6 is a diagram illustrating a pointing system for tracking the selection of an update keyword in an update content file for subsequent insertion within a core content file.

FIGS. 5A and 5B, collectively described as FIG. 5, are logical flow diagrams illustrating the steps of a computer-implemented process for updating an indexed core content file with the contents of an indexed update content file. FIG. 6 is a diagram illustrating three update content files, each comprising a list of update keywords, for updating a core content file. Referring now to FIGS. 1, 5, and 6, the update process begins at the START step 500 by obtaining one or more update content files, such as the update content files $U_1$, $U_2$, and $U_3$. For the preferred update process, the update content files $U_1$, $U_2$, and $U_3$ are downloaded from an on-line service via a distributed computer network and stored on a memory storage device, such as a hard disk drive, on the host computer. The update content files 600, 602, and 604 are typically ordered in chronological fashion, wherein the update content file $U_1$ represents update content created earlier than the update content file $U_2$, the update content file $U_2$ contains content created earlier than the update content file $U_3$, and so forth. For example, the update content file $U_1$ can represent the update content for the month of September, whereas the update content file $U_2$ represents the update content for the following month, October.

In step 502, an update keyword is identified in the update keyword list of each update content file. The keyword is identified by setting a pointer to the keyword having the lowest value in each of the update content files. For the example shown in FIG. 6, a pointer $P_1$ is initialized by assigning it to the update keyword "Bob". Likewise, a pointer $P_2$ is used to identify the update keyword "Apple" in the update keyword list 602, and a pointer $P_3$ identifies the update keyword "Cat" in the update keyword list 604. The update keywords of the update keyword lists 600, 602, and 604 are ranked-ordered within their respective files from low value to high value. Consequently, the update keyword "Bob" in the update keyword list 600 is assigned an update keyword index number of "1". Similarly, the update keywords "Apple" and "Cat" in the update keyword lists 602 and 604 are respectively assigned the update keyword index numbers of "1". Because the update keywords in the example shown in FIG. 6 represent alphanumeric data strings, the rank ordering process for the update keyword lists 600, 602, and 604 places the update keywords in alphabetical order. By setting the pointers $P_1$, $P_2$, and $P_3$ to the update keyword having the lowest value in each of the update keyword lists 600, 602, and 604, the pointers $P_1$, $P_2$, and $P_3$ are initialized to begin the update process at a common start point.

In step 504, a core offset value is set to an initial predetermined value, typically zero, thereby initializing the core offset value for the update process. The core offset value can be maintained by a counter and, consequently, step 504 can be viewed as initializing a counter to a start count value. Because the core offset value represents the amount of offset for a core keyword as a result of the insertion of an updated keyword, the initial core offset value defines a minimum level for shifting the core keyword affected by an insertion point.

In step 506, the particular update keyword having the lowest value among the set of identified update keywords is selected. The selection of the particular update keyword also supports an identification of its update keyword index number and the corresponding update content file. The identified update keyword, its update keyword index number, and the corresponding update content file can be assigned to variable names to support this computer-implemented process. If more than one have the same lowest value, the update keyword in the most recent update content file is selected and the pointer is incremented on the others. In FIG. 6, the update keyword having the lowest value among the identified update keywords is "Apple", which is maintained in the update keyword list 602 of the update content file $U_2$ and identified by the update keyword index number of "1".

In step 508, a virtual keyword list is constructed by determining the core keyword insertion point, i.e., the position of insertion for the identified update keyword within the core keyword list for the core content file. In step 508, the insertion point for the identified update keyword is determined by finding the smallest core keyword that is greater than or equal to the value of the identified update keyword. This insertion point is preferably determined by placing the identified update keyword immediately prior to a core keyword having the smallest value closest to the value of the identified update keyword. In this manner, the identified update keyword is typically placed adjacent to the core keyword that is slightly larger than the identified update keyword. Construction of the virtual keyword list is further supported by a determination of the shift in position of the core keyword(s) affected by the insertion of the identified update keyword. For example, each core keyword having a value higher than the value of the identified update keyword is affected by the insertion point. This virtual keyword list contains the core keywords of the core keyword list maintained by the core content file and each identified update keyword inserted into the core keyword file.

As shown by the example in FIG. 6, a core keyword list 608 associated with a core keyword file contains numerous entries, each containing a core keyword identified by a core keyword index number. For the identified update keyword of "Apple", the core keyword having the smallest value greater than or equal to the value of this identified update keyword is "Apron". Consequently, the insertion point for the update keyword "Apple" is immediately prior to the core keyword "Apron". This placement of the update keyword "Apple" adjacent to the core keyword "Apron" effectively shifts this core keyword by a single position in the virtual keyword list.

In step 510, a new table entry is created within an index mapping table, such as the data structure shown in FIG. 4, to track the insertion of the identified update keyword and the shifted position or offset for the core keyword(s) affected by the insertion point. For multiple update content files, an entry within the index mapping table can contain four data fields, including a virtual table index number, a core offset value, an update file identifier, and an update index. The virtual table index number field contains a value for the virtual keyword index number that defines the position of the identified update keyword in the virtual keyword list. In other words, the value of the virtual table index number field is defined by the combination of the core keyword insertion point and the present core offset value. The core offset value field is assigned the present value of the core offset value. The update file identifier field is assigned the identifier for the update content file associated with the corresponding update keyword. The update index field is assigned the update keyword index number for the identified update keyword. In step 512, each of the fields for the new table entry is assigned a value, as described in more detail below with respect to FIG. 7.

For the example in FIG. 6, the identified update keyword of "Apple" is associated with a table entry having a virtual table index number of "2", which represents the insertion point for this keyword. The core offset value field is assigned a value of "1" based on the present value of "1" for the core offset value. The update file identifier field is completed by the identifier of "$U_1$" for the update keyword list 602. The update index field is completed by the update keyword index number of "1" for the identified update keyword of "Apple".

In step 514, the pointer for the update content file associated with the identified update keyword is incremented. In this manner, the pointer is set to the update keyword having the next lowest value in this update content file. For the example shown in FIG. 6, the pointer $P_2$ is incremented by setting the pointer to the update keyword "Astor".

In step 516, an inquiry is conducted to determine whether an additional update keyword remains within an update keyword list for processing. If so, the "YES" branch is followed from step 516 to step 506. If the response to this inquiry is negative, the "NO" branch is followed from step 516 to step 518 and the update process is terminated.

Figure 7:
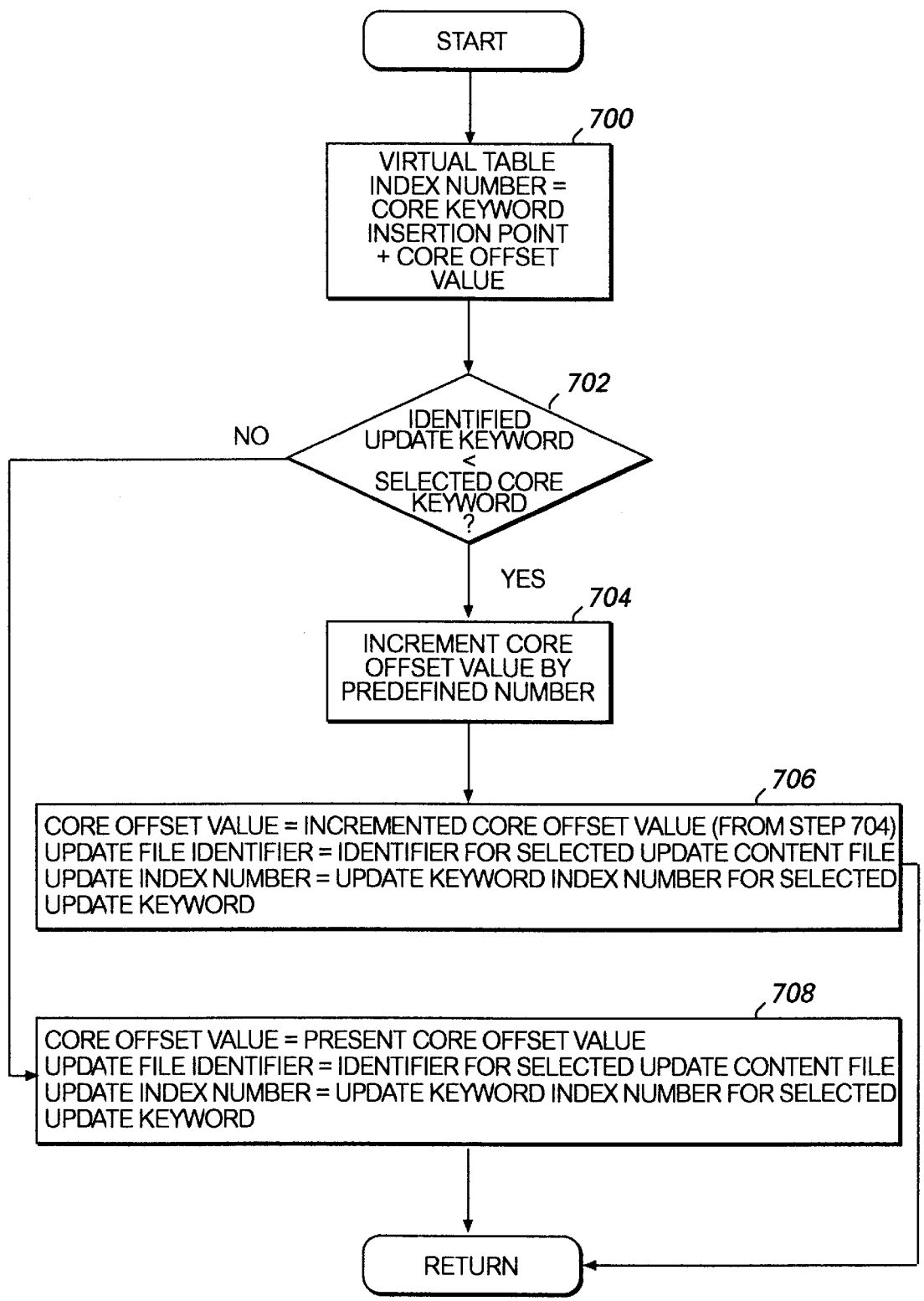
FIG. 7 is a logical flow diagram illustrating the steps for creating an entry of an index mapping table in accordance with an embodiment of the present invention.

FIG. 7 is a logical flow diagram illustrating the steps for assigning values to the data fields of a new table entry in the index mapping table. The assigned values for the fields of a table entry can vary based upon a determination of whether the identified update keyword is less than or equal to the selected core keyword. In step 700, the virtual table index number field for the new table entry is defined by the combination of the core keyword insertion point and the present core offset value. The core keyword insertion point is represented by the core keyword index number for the smallest core keyword that is greater than or equal to the identified update keyword. In step 702, an inquiry is conducted to determine whether the identified update keyword is less than the selected core keyword. If so, the identified update keyword represents a keyword to update existing indexed content. The "YES" branch is followed from step 702 to step 704 and the core offset value is incremented, typically by a value of "1". In step 706, the remaining fields of the new table entry are completed. The core offset value field is assigned the present core offset value, which was incremented in step 704. The update file identifier field is assigned the identifier for the selected update content file. To complete the assignment of values to the fields of the new table entry, the update keyword index number field is assigned the update keyword index number for the selected update keyword.

If the response to the inquiry in step 702 is negative, the identified update keyword represents a keyword for content that replaces the existing indexed content. The "NO" branch is followed from step 702 to step 708 because the identified update keyword is equal to the selected core keyword. In step 708, the remaining data fields for a new table entry of the index mapping table are completed. Specifically, the core offset value field is assigned the present core offset value. The update file identifier field is assigned the identifier for the selected update content file. The update index field is assigned the update keyword index number for the selected update keyword.

Upon completing steps 706 or 708, the values for the new table entry in the index mapping table are returned.

In view of the foregoing, it will be understood that an update content file can be used to provide addendum or replacement-type information to update an existing core content file. To distinguish between the applications for update content files, it is useful to differentiate between a replacement-type update keyword and an addendum-type update keyword. For example, a token can be associated with an update keyword to designate whether this keyword is a replacement or an addendum. In other words, this token designates whether the update keyword represents replacement content or is additional content for existing core content. By marking replacement-type and addendum-type update keywords with different tokens, these update keywords can be presented to the user in proper display format for addendum and replacement-type content. Thus, the value assigned to the token can be used to distinguish between an update keyword corresponding to addendum content and an update keyword corresponding to replacement content.

For the preferred embodiment, an update keyword in an update keyword list of an update content file can include the combination of a delimiter and a token. The delimiter marks the end of the update keyword and the start of the token. Although any readily distinguishable character or symbol can be selected for a delimiter, the preferred delimiter is the ASCII value of "31", which represents a non-printable character for the ASCII character set. Different tokens are selected to distinguish between the replacement and addendum-type update keywords. For example, the token "R" can be used to designate a replacement-type update keyword, whereas the token "A" can be used to designate an addendum-type update keyword.

To accommodate this distinction between addendum and replacement-type update keywords, an additional data field can be added to the index mapping table. This additional data field, called the "duplicate type" field, includes the token "A" if the associated update keyword is an addendum-type update keyword and the token "R" if the update keyword is a replacement-type update keyword. This duplicate type field of the index mapping table is set in the event that the corresponding update keyword is an addendum or replacement-type update keyword.

Figure 8A:
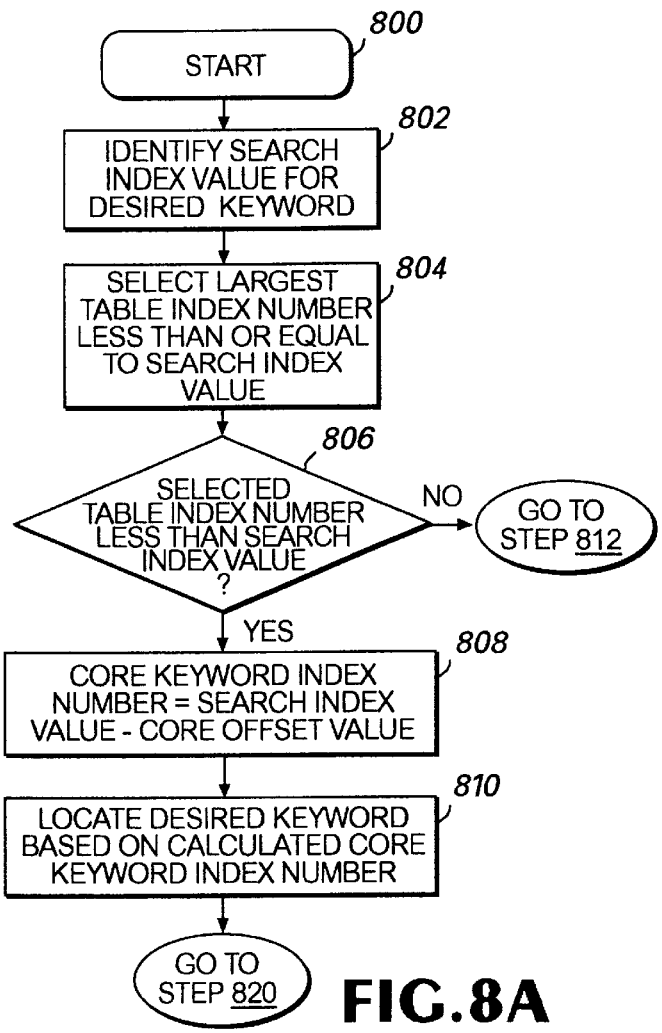
FIGS. 8A and 8B, collectively described as FIG. 8, are logical flow diagrams illustrating a computer-implemented method for searching an index mapping table to obtain a desired keyword when given a virtual keyword index number in accordance with an embodiment of the present invention.
Figure 8B:
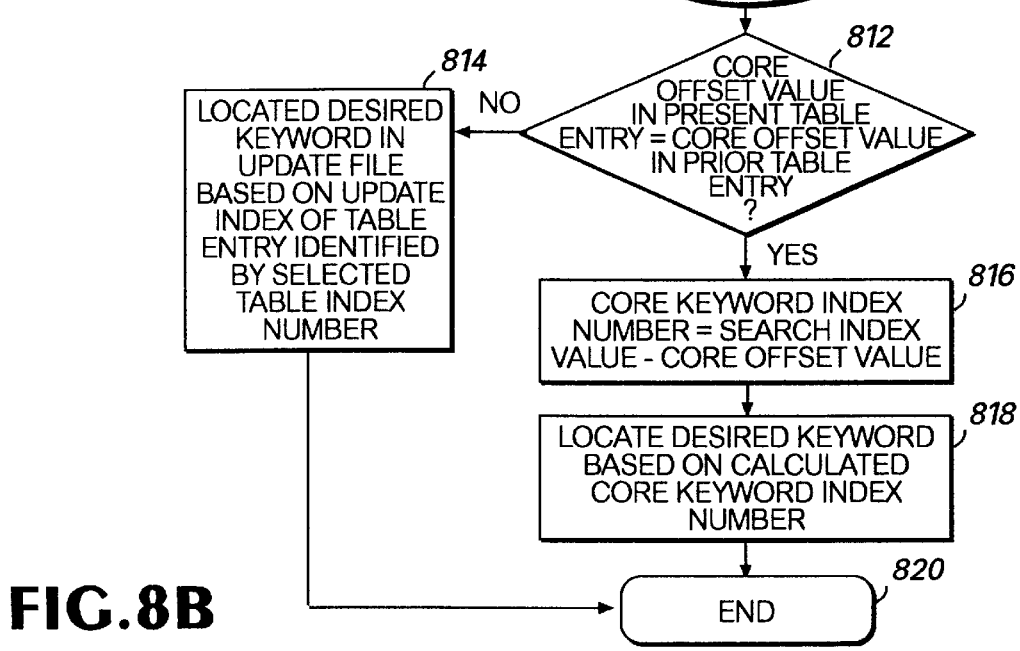

FIGS. 8A and 8B, collectively described as FIG. 8, are logical flow diagrams illustrating a computer-implemented process for searching for a desired keyword, given a virtual keyword index number, in an updated version of an indexed core content file based upon the use of an index mapping table. Referring now to FIG. 8, the searching process begins at the START step 800 and proceeds to step 802 to identify the known search index value, i.e., the virtual keyword index number, for the desired keyword. In step 804, the largest table index number in the index mapping table that is less than or equal to the search index value is selected.

In step 806, an inquiry is conducted to determine whether the selected table index number is less than the search index value. If so, the "YES" branch is followed from step 806 to step 808. In step 808, a core keyword index number is calculated based on the difference between the search index value and the core offset value. The core offset value is obtained from the core offset value field of the table entry. By using the calculated core keyword index number in step 810, the desired keyword can be found in the core keyword list. After locating the desired keyword, the search process terminates at the END step 820.

If the response to the inquiry in step 806 is negative, the "NO" branch is followed from step 806 to step 812. This negative response indicates that the search index value is equal to the selected index number in the index mapping table. In step 812, an inquiry is conducted to determine whether the core offset value in the table entry associated with the selected index number is equal to the core offset value in the immediately preceding table entry. If so, the "YES" branch is followed to step 816. In step 816, a core keyword index number is calculated based on a difference between the search index value and the core offset value for the present table entry. In turn, this calculated core keyword index number is used in step 818 to locate the desired keyword within the core keyword list. The search process terminates in step 820 in response to locating the desired keyword.

If the inquiry in step 812 produces a negative response, the "NO" branch is followed from step 812 to step 814. In step 814, the update keyword index number for the table entry corresponding to the selected index number can be used to look-up the desired keyword within the update content file. The search process then terminates at the END step 820 in response to locating the desired keyword within this update content file.

Figure 9:
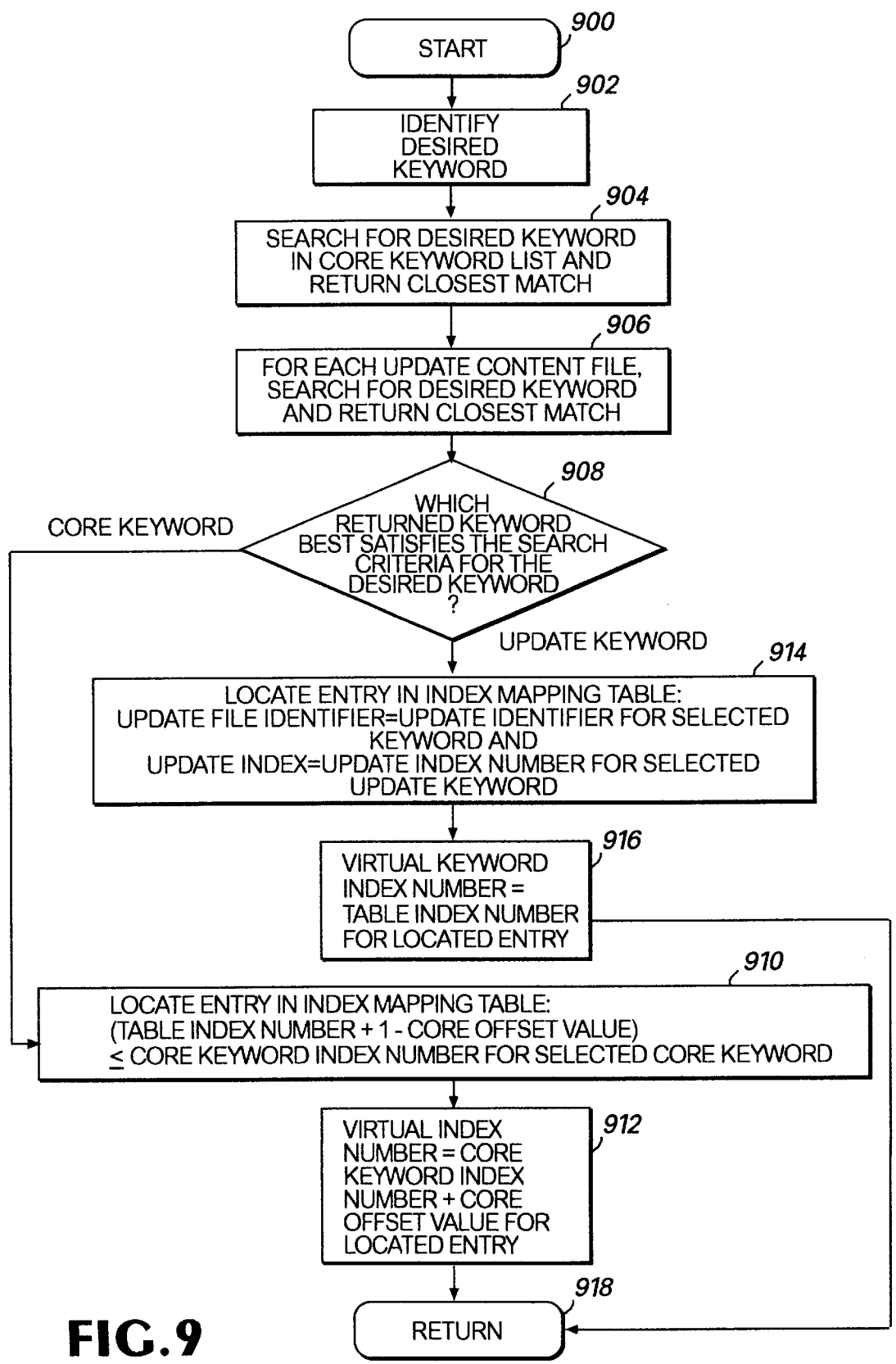
FIG. 9 is a logical flow diagram illustrating a computer-implemented method for searching an index mapping table to obtain a desired virtual keyword index number when given a search keyword.

FIG. 9 is a logical flow diagram illustrating the steps of a computer-implemented process for searching for a virtual keyword index number when given a search keyword. Turning now to FIGS. 1 and 9, the process begins at the START step 900 and proceeds to step 902. In step 902, the search keyword is identified to initiate the search process. In step 904, a search is conducted to locate the identified search keyword within the core keyword list. For the core keyword representing the closest match to the identified search keyword, the core keyword index number and the value for this core keyword are returned. Similarly, a search for the identified search keyword is conducted for each update content file in step 906. For the update keyword representing the closest match in each update content file, the update keyword index number, the update content file name or identifier, and the update keyword value is returned.

For step 904, the core keyword index number for the selected core keyword and the value for this "best match" keyword are recorded. Similarly, for each update content file in step 906, the update keyword index number, the update content file identifier, and the value for the "best match" update keyword are recorded. Those skilled in the art will appreciate that the need for recording the update content file identifier can be eliminated in the event that this search process is conducted for only a single update content file.

In step 908, based on search criteria, a determination is made whether the closest match to the search keyword is provided by the value of a core keyword or an update keyword. In the event that the best match for the search keyword is provided by a core keyword, the "core keyword" branch is followed to step 910. In step 910, a particular table entry within the index mapping table is located by finding the entry having values that satisfy the following function: a value defined by "virtual index table number+1−core offset value" is less than or equal to the core keyword index number for the selected keyword. In step 912, the virtual keyword index number is specified by the sum of the core keyword index number and the core offset value for the particular table entry.

In the event that the best match for the selected search keyword is presented by an update keyword, then the "update keyword" branch is followed from step 908 to step 914. In step 914, a particular table entry in the index mapping table is located by searching for an entry having an update file identifier field that matches the identifier for the update content file associated with the selected update keyword and an update index field that matches the update keyword index number for the selected update keyword. In step 916, the virtual keyword index number is defined by the table index number for the particular table entry.

The process terminates at step 918 upon completing the operations specified by step 912 or step 916.

To locate the keyword representing the closest match to the selected search keyword, a search criterion preferably defines a search to first find the identical value for this selected search keyword, i.e., a "direct hit". In the event that a "direct hit" is not located, then this search will return the closest match. For the preferred embodiment, the closest match is represented by the largest keyword that is less than or equal to the value for the selected search keyword. Alternatively, the closest match can be defined by the smallest keyword that is greater than or equal to the selected search keyword.

It will be appreciated that a search criterion can be specified to select the keyword that represents the best match of all available matches for the selected search keyword. Search criteria, however, is not necessarily limited to selecting only a single "best match" keyword. Instead, search criteria can be used that returns a set of "best match" results. For example, this type of search can be used to return each keyword that starts with a selected set of letters.

Figure 10:
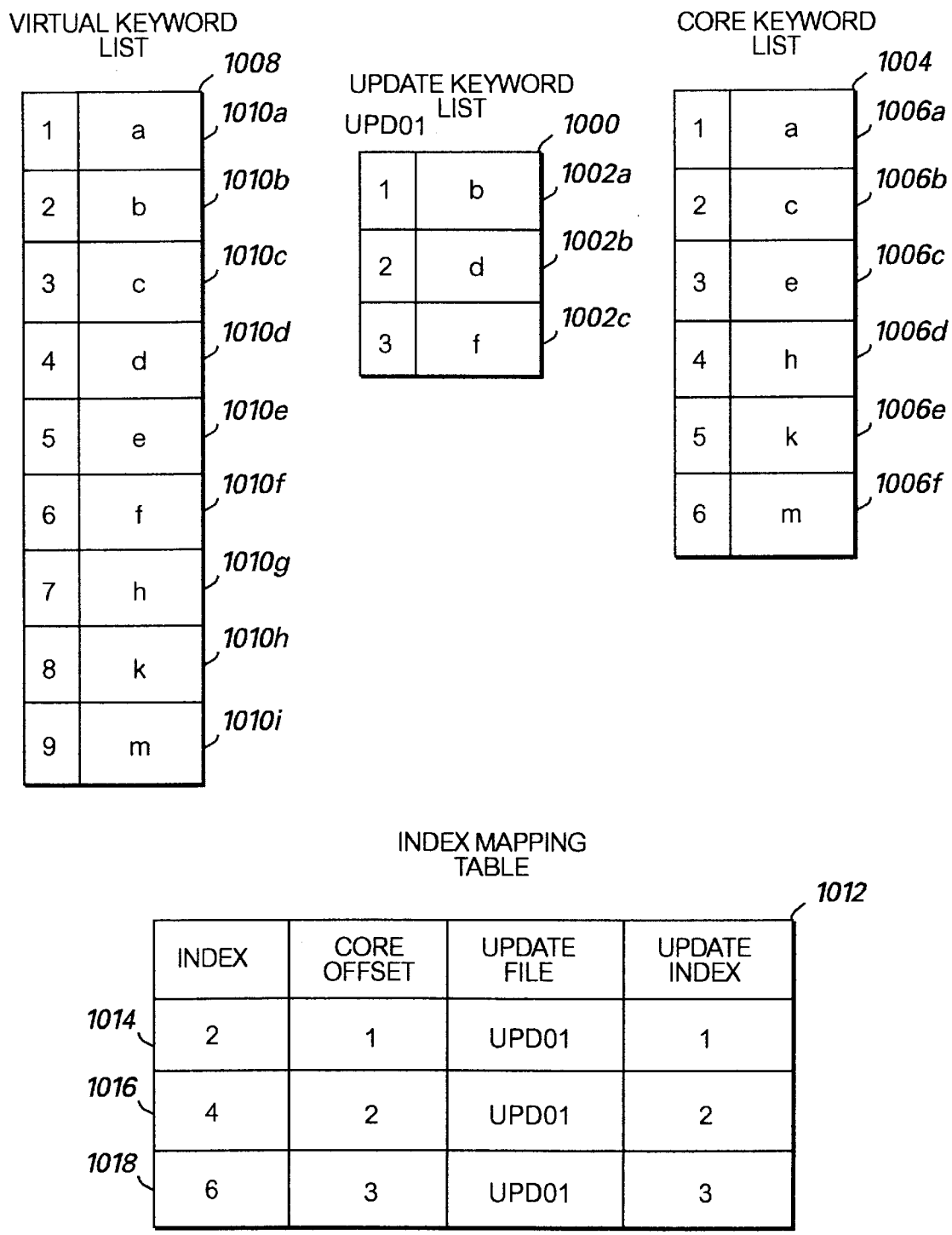
FIG. 10 is an illustration showing a representative example of a core keyword list, update keyword list, and a virtual keyword list, each including index numbers corresponding to keywords, and a corresponding index mapping table, in accordance with an embodiment of the present application.

FIG. 10 is a representative example of a core keyword list, an update keyword list, a corresponding virtual keyword list and an index mapping table. An update keyword list 1000 contains three entries, the update keywords 1002a, 1002b, and 1002c. For entry 1002a, the update keyword is presented by the value "b", which is assigned an update entry number of "1". Similarly, the entry 1002b is represented by an update keyword having the value "d" and assigned an update keyword index number of "2". The entry 1002c is represented by an update keyword having the value "f" and assigned an update keyword index number of "3".

For the representative example of FIG. 10, a core keyword list 1004 contains six entries 1006a–f, each represented by a core keyword and a corresponding core keyword index number. For example, the entry 1006a is represented by a core keyword having the value "a" and assigned a core keyword index number of "1".

Still referring to the representative example of FIG. 10, a virtual keyword list 1008 contains nine entries 1010a–i, each assigned a virtual keyword index number and represented either by a core keyword or by an update keyword. For this example, the values associated with these keywords are ordered in alphabetical order. Thus, the entry 1002a for the update keyword list 1000, which has a value of "b", is mapped into the second entry of the virtual keyword list, the entry 1010b. Although the virtual keyword list 1008 is not a physical entity maintained in computer memory, it represents the integration of a core keyword list with an update keyword list.

An index mapping table 1012 is used for mapping the update keywords 1002 and the core keywords 1006 to entries within the virtual keyword list 1008. A first entry of the index mapping table 1012, the table entry 1014, contains values for the virtual table index number field, the core offset value field, the update file identifier field, and the update index field. For the table entry 1014, the virtual table index field contains the value "2"; the core offset value field contains the value "1"; the update file identifier field contains an identifier for the update content file containing the update keyword list 1000, the identifier "UPD01"; and the update index field contains the value "1". The table entry 1016 includes a virtual table index number field of "4"; the core offset value field of "2"; an update file identifier field of "UPD01"; and an update index field of "2". The table entry 1018 contains a virtual table index number field of "6"; a core offset value field of "3"; an update file identifier field of "UPD01"; and an update index field of "3".

Turning now to FIGS. 9 and 10, the keyword search process of FIG. 9 is now described in view of the representative example of FIG. 10. In step 902, the search keyword "g" is selected. Significantly, this search keyword is not present for either the update keyword list 1000 or the core keyword list 1004. Using the search keyword "g" as the search component, in step 904, the core keyword representing the best match to the search keyword "g" is obtained. This search is conducted by first looking for a core keyword within the core keyword list 1004 that is identical to the search keyword "g". Because the core keyword list 1004 does not include an entry matching the search keyword "g", this search returns the closest match for this search keyword. Specifically, the core keyword having the largest value that is less than or equal to the value for the search keyword is obtained from the core keyword list 1004. In turn, the core keyword index number and the value for this match candidate is recorded. For this example, the matching candidate is represented by the third entry in the core keyword list, the entry 1006c, which is represented by a value of "e" and assigned a core keyword index number of "3".

In step 906, a similar search is conducted to locate the best match in the update keyword list 1000 for the search keyword "g". Because the update keyword list does not include an identical match for this search keyword, the best match is represented by the update keyword having the largest value that is less than or equal to the search keyword, in this case, the "best match" is represented by the update keyword "f", which is assigned an update keyword index number of "3".

In step 908, the search criterion is applied to determine whether the core keyword or the update keyword best matches the search keyword. In other words, an inquiry is conducted to determine whether the core keyword "e" is a better match than the update keyword "f" for the search keyword "g". One search criterion is based on the selection of the value of either the core keyword or the update keyword that is less than or equal to the value for the search keyword. Alternatively, another search criterion is based upon the selection of either the core keyword or the update keyword having the smallest value that is greater than or equal to the value for the search keyword. Those skilled in the art will appreciate that other search criteria can be applied to determine which keyword represents the best match for the selected search keyword.

If the search criterion defines the "best match" as the largest keyword that is less than or equal to the search keyword "g", then the update keyword "f" is selected in step 908. By following the "update keyword" branch from step 908 to steps 914 and 916, the combination of the update keyword value and the corresponding update keyword index number is converted to a virtual keyword index number for the search keyword. This conversion is completed by searching the index mapping table for a table entry having an update file identifier field and update index field containing values that match the recorded values for the selected update keyword. The virtual keyword index number is defined by the value of the virtual table index number field for this table entry.

In view of the foregoing, the present invention provides a system for integrating multiple indexed files and searching the resulting integrated indexed file. An indexed core content file, which includes a core keyword list containing core keywords, can be updated with update keywords of an update content file. The update content file is accessed and, in response, a virtual keyword list is generated. The virtual keyword list, which contains update keywords and core keywords, is created by determining a position for inserting each update keyword within the core keyword list and a shifted position for each core keyword affected by the insertion of each update keywords. An index mapping table is created for tracking the positions of the update keywords and the core keywords within the virtual keyword list. The index mapping table maps the positions of the update keywords within the virtual keyword list to the update keywords within the update content file and maps the positions of the core keywords within the virtual keyword list to the core keywords within the core keyword list.

It will be appreciated that the present invention indeed fulfills the needs of the prior art described hereinabove and meets the above-stated objects and advantages. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A computer-implemented method for updating an indexed core content file having a core keyword list containing core keywords, each identified by a core keyword index number, with update keywords of an indexed update content file, comprising the steps of:

reading the update content file;

generating a virtual keyword list of update keywords and core keywords by determining a position for inserting each update keyword within the core keyword list and a position for each core keyword resulting from insertion of each update keyword; and creating an index mapping table for tracking the positions of the update keywords and the core keywords within the virtual keyword list.

2. The method of claim 1, wherein the index mapping table maps the positions of the update keywords within the virtual keyword list to the update keywords within an update keyword list of the update content file and maps the positions of the core keywords within the virtual keyword list to the core keywords within the core keyword list.

3. The method of claim 1, wherein the index mapping table comprises table entries, each characterized by:

a table index number defining the position of a corresponding update keyword in the virtual keyword list;

a core offset value defining a shift in position of the core keywords located after the corresponding update keyword, the position shift occurring as a result of the insertion of the update keywords within the core keyword list;

an update file identifier for identifying the update content file associated with the corresponding update keyword; and an update keyword index number for the corresponding update keyword, the update keyword index number defining the position of the corresponding update keyword within an update keyword list of the identified update content file.

4. The method of claim 3, wherein the difference between the table index number and the core offset value defines the core keyword index number for the core keywords located after the corresponding update keyword.

5. The method of claim 3, wherein the core offset value defines the difference between an original position of the core keyword within the core keyword list and the shifted position of the core keyword within the virtual keyword list.

6. The method of claim 3, wherein the core keyword list is maintained as an ordered list, and the corresponding update keyword is inserted within the core keyword list at a position immediately prior to the core keyword having a value that is greater than a value for the corresponding update keyword.

7. The method of claim 6, wherein the core keyword list is ordered by positioning the core keywords in a sequence from low value to high value.

8. A computer-readable medium on which is stored an index mapping table for mapping positions of update keywords and core keywords to a virtual keyword list created in response to updating an indexed core content file with indexed update content files, each core keyword maintained in a core keyword list of the core content file and identified by a core keyword index number, each update keyword maintained in an update keyword list of one of the update content files and identified by an update keyword index number, the index mapping table comprising table entries, each table entry containing fields, comprising:

a table index number defining a position of a corresponding update keyword in the virtual keyword list;

a core offset value defining a shift in a position of the core keywords located after the corresponding update keyword, the position shift occurring in response to inserting the update keywords within the core keyword list;

an update file identifier for identifying the update content file associated with the corresponding update keyword; and an update keyword index number for the corresponding update keyword, the update keyword index number defining the position of the corresponding keyword within the update keyword list of the identified update content file.

9. The computer-readable medium of claim 8, wherein the difference between the table index number and the core offset value defines the core keyword index number for the core keywords located after the corresponding update keyword.

10. The computer-readable medium of claim 8, wherein the core offset value defines the difference between an original position of the core keyword within the core keyword list and the shifted position of the core keyword within the virtual keyword list.

11. The computer-readable medium of claim 8, wherein the core keywords are ordered within the core keyword list from low value to high value, and the corresponding update keyword is inserted within the core keyword list at a position immediately prior to the core keyword having a value that is slightly greater than a value for the corresponding update keyword.

12. The computer-readable medium of claim 8, wherein each entry in the index mapping table further comprises a token in a duplicate-type field of the index mapping table, the token assigned either a first value or a second value, the first value indicating that the update keyword corresponding to the token represents addendum content, and the second value indicating that the corresponding update keyword represents replacement content.

13. A method for updating an indexed core content file having a core keyword list containing core keywords, each identified by a core keyword index number, with update keywords of update content files, each update keyword having a corresponding value, the method comprising the steps of:
(a) initializing a pointer for each update content file by setting the pointer to select the update keyword having the lowest value in each update content file;
(b) initializing a core offset value by assigning the core offset value a predefined value;
(c) identifying the update keyword having the lowest value among the update content files and selected by the pointer;
(d) constructing a virtual keyword list by determining a position for inserting the identified update keyword within the core keyword list immediately prior to a selected core keyword having a value that is equal to or slightly greater than the identified update keyword and a position for the selected core keyword based on the insertion of the update keyword within the core keyword list;
(e) creating an entry within an index mapping table for tracking the positions of the update keywords and the core keywords within the virtual keyword list;
(f) incrementing the pointer for the selected update content file; and
(g) repeating steps a–f for each remaining update keyword.

14. The method of claim 13, wherein each entry in the index mapping table comprises:
a table index number defining the position of a corresponding update keyword in the virtual keyword list;
the core offset value, which defines a shift in the position of the selected core keyword within the core keyword list;
an update file identifier for identifying the update content file associated with the identified update keyword; and
an update keyword index number for the identified update keyword, the update keyword index number defining the position of the identified keyword within an update keyword list of the update content file.

15. The method of claim 14, wherein the update keywords within the update content files are sorted based on values assigned to the update keywords, the update keywords sorted from a low value to a high value.

16. The method of claim 14, wherein a difference between the table index number and the core offset value defines one of the core keyword index numbers of the core keyword list.

17. The method of claim 14, wherein, in the event that the identified update keyword is equal to the selected core keyword, then the update keyword represents supplemental content.

18. A method for searching for a desired keyword in an updated version of an indexed core content file by using a index mapping table that maps positions of update keywords and core keywords to a virtual keyword list, the virtual keyword list created in response to updating the indexed core content file, the indexed core content file comprising core keywords maintained in a core keyword list and identified by a core keyword index number, the indexed core content file updated with update content files containing the update keywords, each update keyword maintained in an update keyword list and identified by an update keyword index number,
the index mapping table comprising a table index number defining a position of a corresponding update keyword in the virtual keyword list, a core offset value defining a shift in position of the core keywords located after the corresponding update keyword, the position shift occurring as a result of the insertion of the update keywords within the core keyword list, an update file identifier for identifying the update content file associated with the corresponding update keyword, and an update index for defining an update keyword index number for the corresponding update keyword, the update keyword index number defining the position of the corresponding update keyword within an update keyword list of the identified update content file, comprising the steps of
(a) identifying a search index number corresponding to a desired keyword;
(b) selecting the largest table index number in the index mapping table that is less than or equal to the search index number;
(c) if the selected table index number is not equal to the search index number, then calculating a core keyword index number by subtracting the core offset value from the search index value, and using the calculated core keyword index number to locate the desired keyword in the core keyword list; and
(d) if the selected table index number is equal to the search index number, then comparing the core offset value associated with the selected index value to the core offset value in a previous entry of the index mapping table;
if the core offset values are different, then use the update index associated with the selected index number to locate the update keyword index number, and use the update keyword index number to look-up the desired keyword in the update keyword list; and
if the core offset values are the same, then calculate a core keyword index number by subtracting the core offset value from the search index number, and use the calculated core keyword index number to locate the desired keyword in the core keyword list.

19. A computer system operative to execute a program module for updating an indexed core content file having a core keyword list containing core keywords, each identified by a core keyword index number, with update keywords of an update content file, comprising:

a processing device; and a memory, coupled to the processing device, for storing the program module;

the processing device, in response to instructions of the program module, operates to:

read the update content file;

generate a virtual keyword list of update keywords and core keywords by determining a position for inserting each update keyword within the core keyword list and a position for each core keyword resulting from insertion of each update keyword; and create an index mapping table for tracking the positions of the update keywords and the core keywords within the virtual keyword list.

20. The computer system of claim 19, wherein the index mapping table comprises table entries, each characterized by:

a table index number defining the position of a corresponding update keyword in the virtual keyword list;

a core offset value defining a shift in position of the core keywords located after the corresponding update keyword, the position shift occurring as a result of the insertion of the update keywords within the core keyword list;

an update file identifier for identifying the update content file associated with the corresponding update keyword; and an update keyword index number for the corresponding update keyword, the update keyword index number defining the position of the corresponding keyword within an update keyword list of the update content file.

21. A computer-readable medium on which is stored a program module for updating an indexed core content file having a core keyword list containing core keywords, each identified by a core keyword index number, with update keywords of an update content file, the program module comprising instructions which, when executed by the computer, performs the steps of:

reading the update content file;

generating a virtual keyword list of update keywords and core keywords by determining a position for inserting each update keyword within the core keyword list and a position for each core keyword resulting from insertion of each update keyword; and creating an index mapping table for tracking the positions of the update keywords and the core keywords within the virtual keyword list.

22. The computer-readable medium of claim 21, wherein the index mapping table comprises table entries, each characterized by:

a table index number defining the position of a corresponding update keyword in the virtual keyword list;

a core offset value defining a shift in position of the core keywords located after the corresponding update keyword, the position shift occurring as a result of the insertion of the update keywords within the core keyword list;

an update file identifier for identifying the update content file associated with the corresponding update keyword; and an update keyword index number for the corresponding update keyword, the update keyword index number defining the position of the corresponding keyword within an update keyword list of the update content file.

23. A method for searching for a desired virtual keyword index number for a virtual keyword list by using an index mapping table that maps positions of update keywords and core keywords to the virtual keyword list, the virtual keyword list created in response to updating an indexed core content file, the indexed core content file comprising core keywords maintained in a core keyword list and identified by a core keyword index number, the indexed core content file updated with update content files containing the update keywords, each update keyword maintained in an update keyword list and identified by an update keyword index number, the index mapping table comprising entries having a table index number defining a position of a corresponding update keyword in the virtual keyword list, a core offset value defining a shift in position of the core keywords located after the corresponding update keyword, the position shift occurring as a result of the insertion of the update keywords within the core keyword list, an update file identifier for identifying the update content file associated with the corresponding update keyword and an update index for defining an update keyword index number for the corresponding update keyword, the update keyword index number defining the position of the corresponding update keyword within the update keyword list of the update content file, comprising the steps of (a) identifying a search keyword corresponding to the desired virtual keyword index number;

(b) searching for the search keyword in the core keyword list and returning a selected core keyword representing the closest match to the search keyword;

(c) for each update content file, searching for the search keyword in the update keyword list and returning a selected update keyword representing the closest match to the search keyword;

(d) applying search criteria to determine which of the selected core keyword and each selected update keyword represents the best match for the search keyword; and (e) in event that the selected core keyword represents the best match, then locate one of the entries in the index mapping table wherein the core keyword index number for the selected keyword is greater than a value defined by "the table index number+1–the core offset value", wherein the desired virtual keyword index number is defined by the sum of the core keyword index number and the core offset value for the located entry, in event that one of the selected update keywords represents the best match, then locate one of the entries in the index mapping table wherein the update file identifier is equal to the update identifier for the update content file associated with the selected update keyword and the update index is equal to the update keyword index number for the selected update keyword, wherein the desired virtual keyword index number is defined by the table index number for the located entry.

24. The method of claim 23, wherein the step of searching for the search keyword in the update keyword list for each update content file can return a set of selected update keywords representing the closest match to the search keyword.

* * * * *